(12) United States Patent
Grand et al.

(10) Patent No.: US 11,402,159 B2
(45) Date of Patent: Aug. 2, 2022

(54) HEAT EXCHANGER AND HEAT EXCHANGE METHOD USING SAME

(71) Applicant: L'Air Liquide, Societe Anonyme pour l'Etude et l'Exploitation des Procedes Georges Claude, Paris (FR)

(72) Inventors: Benoit Grand, Versailles (FR); Patrick Recourt, Marcoussis (FR); Remi Tsiava, Saint Germain-les-Corbeil (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 50 days.

(21) Appl. No.: 16/472,677

(22) PCT Filed: Dec. 19, 2017

(86) PCT No.: PCT/EP2017/083616
§ 371 (c)(1),
(2) Date: Jun. 21, 2019

(87) PCT Pub. No.: WO2018/114993
PCT Pub. Date: Jun. 28, 2018

(65) Prior Publication Data
US 2021/0131744 A1    May 6, 2021

(30) Foreign Application Priority Data
Dec. 21, 2016   (EP) ..................................... 16306762

(51) Int. Cl.
*F28D 20/00* (2006.01)

(52) U.S. Cl.
CPC .. *F28D 20/0056* (2013.01); *F28D 2020/0021* (2013.01); *F28D 2020/0078* (2013.01); *F28D 2020/0082* (2013.01)

(58) Field of Classification Search
CPC ......... F28F 27/006; F23L 15/02; F23L 15/04; F28D 20/0056; F28D 17/005
See application file for complete search history.

(56) References Cited

U.S. PATENT DOCUMENTS 4,901,789 A * 2/1990 Hengelmolen ..... F28D 21/0008
165/101
5,191,930 A * 3/1993 Chaney ................... F23L 15/02
165/4
(Continued)

FOREIGN PATENT DOCUMENTS

| CA | 2 790 688 | 9/2011 |
| EP | 2 993 594 | 10/2015 |

(Continued)

OTHER PUBLICATIONS

Aluminum Oxide Material Properties, "http://accuratus.com:80/alumox.html," Feb. 2015, Accessed via http://web.archive.org (Year: 2015).*

(Continued)

*Primary Examiner* — Eric S Ruppert
(74) *Attorney, Agent, or Firm* — Christopher J. Cronin (57) ABSTRACT

Heat exchanger presenting a first gas flow path containing a heat-regenerative packing and a separate second gas flow path containing a heat-conductive packing and use of same for heating a gas to be heated by means of heat recovered from a hot gas in a two-phase alternating heat-recovery process.

5 Claims, 4 Drawing Sheets

(56) References Cited

U.S. PATENT DOCUMENTS

| | | | |
|---|---|---|---|
| 8,475,161 B2 * | 7/2013 | Wunning | F23C 9/006 |
| | | | 431/11 |
| 2009/0011290 A1 * | 1/2009 | Chudnovsky | C01B 3/34 |
| | | | 429/423 |
| 2010/0081103 A1 | 4/2010 | Kobayashi | |
| 2014/0074314 A1 | 3/2014 | Niknafs et al. | |
| 2014/0087322 A1 * | 3/2014 | Kang | F23L 15/00 |
| | | | 432/29 |
| 2015/0300751 A1 | 10/2015 | Koschnitzke et al. | |
| 2017/0045303 A1 | 2/2017 | Danov et al. | |

FOREIGN PATENT DOCUMENTS

| | | | | |
|---|---|---|---|---|
| GB | 1246581 A | * | 9/1971 | F22B 27/14 |
| JP | 52019351 A | * | 2/1977 | |
| JP | 53067150 A | * | 6/1978 | F28D 15/0275 |
| JP | S57-77680 | | 5/1982 | |
| JP | S59-145490 | | 8/1984 | |
| WO | WO 2014/039318 | | 3/2014 | |

OTHER PUBLICATIONS

International Search Report and Written Report for PCT/EP2017/083616, dated Mar. 15, 2018.

* cited by examiner

HEAT EXCHANGER AND HEAT EXCHANGE METHOD USING SAME

CROSS-REFERENCE TO RELATED APPLICATIONS

This application is a § 371 of International PCT Application PCT/EP2017/083616, filed Dec. 19, 2017, which claims § 119(a) foreign priority to EP patent application EP16306762.2, filed Dec. 21, 2016.

BACKGROUND

Field of the Invention

The present invention relates heat exchange between two fluids.

Related Art

It is known in the art of industrial combustion processes in general and in the field of glass-melting furnaces heated by combustion in particular to save energy by recovering heat from the combustion exhaust gases (fumes) and to transfer said recovered heat to the fuel and/or oxidant gas to be used in the combustion process.

A first known energy-saving method implies the use of a pair of regenerators which function in tandem according to a two-phase cyclic operation mode. Each regenerator defines a regenerator chamber. During the first phase of the cycle hot exhaust gas flows through the regenerator chamber and, in doing so, heats the regenerator chamber. In the second phase of the cycle, gas to be heated flows through the previously heated regenerator chamber and is heated in the process. Throughout the combustion process, the regenerators of the pair of regenerators alternate so that, at all times, one regenerator is in the second phase of the cycle and heats a gas to be heated and the other is in the first phase and is being heated.

In order to achieve a sufficient heat-recovery capacity, the regenerator chamber contains packing (e.g. bricks or a pebble packing) arranged to form gas passages or flues inside the regenerator chamber, while making a maximum of packing surface available for heat transfer (a) between the packing and the hot exhaust gases flowing along the gas passages during the first phase and (b) between the packing and the gas to be heated flowing along the gas passages during the second phase.

An important advantage of regenerators is that they can heat combustion gases to very high temperatures.

A major disadvantage of regenerators is that they are not suited for heating gases which must not enter into contact with exhaust gases or with contaminants present in the exhaust gases and which are deposited onto the packing. This is for example the case when the exhaust gases contain combustible matter and the gas to be heated is an oxygen-rich oxidant.

This problem can be overcome by the use of a recuperator instead of a pair of regenerators. In a recuperator, the hot exhaust gases continuously flow along a first flow path and the gas to be heated continuously flows along a second flow path.

The first and the second flow path are physically separated by a gas-impervious barrier across which heat is transferred from the hot exhaust gases to the gas to be heated.

The continuous heat-exchange process by means of a recuperator is generally a steady-state operation whereby an equilibrium is established between (a) the heat extracted from the hot exhaust gases flowing along the first path and (b) the heat absorbed by the gas to be heated flowing along the second flow path.

As a consequence, one major inconvenience of heat recovery by means of a recuperator in an industrial installation is that the temperature to which the gas can be heated is significantly lower than in the case of regenerative heat exchange.

SUMMARY OF THE INVENTION

It is an aim of the present invention to provide a heat exchange system which combines the above-mentioned advantages of regenerative and recuperative heat recovery.

It is a particular aim of the present invention to enable heating combustion gases (i.e. fuel and/or oxidant) which must not come into contact with hot exhaust gases or deposits therefrom by means of heat recovered from said hot exhaust gases and this to temperatures higher than those thus far possible at industrial level.

Thereto the present invention proposes a heat exchanger presenting a first flow path and a separate second flow path. The heat exchanger presents a first gas inlet into the heat exchanger and a first gas outlet from the heat exchanger, the first gas flow path extending from the first gas inlet to the first gas outlet. The heat exchanger likewise presents a second gas inlet into the heat exchanger and a second gas outlet from the heat exchanger, the second gas flow path extending from the second gas inlet to the second gas outlet. The first flow path is physically separated from the second flow path by means of a gas-impermeable heat-conducting barrier. Said gas-impermeable heat-conducting barrier ensure that a gas flowing along the first flow path cannot penetrate into the second flow path and vice versa, while enabling heat to be transferred from the first flow path to the second flow path.

As indicated above, the second flow path is separate from the second flow path. The first gas inlet, the second gas inlet, the first gas outlet and the second gas outlet of the heat exchanger are therefore also distinct from one another.

In accordance with the invention, the first flow path contains a first packing in physical contact with the barrier, said first packing being a heat-regenerative packing, also known as thermal storage packing or heat accumulation packing.

The second flow path contains a second packing in physical contact with the barrier, said second packing being a heat-conductive packing.

In order to effectively absorb and store heat, the first, heat-recuperative, packing must present a sufficient heat capacity. The first packing more particularly advantageously presents a specific heat capacity of at least 400 J/(K*kg), preferably of at least 600 J/(K*kg), more preferably of at least 800 J/(K*kg) and typically not more than 1250 J/(K*kg). Suitable materials for the first packing include electrocast ceramics and ceramics containing one or more of the following materials: alumina ($AL_2O_3$), silicon carbide (SiC) and cordierite.

In order to effectively heat the gas to be heated, the second, heat-conductive, packing must have a sufficient thermal conductivity. The second packing more particularly advantageously presents a thermal conductivity at 20° C. of more than 1.0 W/(m*K), preferably of at least 4.0 W/(m*K), more preferably of at least 10.0 W/(m*K) and even more preferably of at least 15.0 W/(m*K). The a thermal conductivity at 20° C. of the material of the second packing may for example be up to 30 W/(m*K). Suitable materials for the second packing include ceramics containing silicon carbide, alumina, cordierite and combinations of said materials.

The materials used for the first and second packing are further selected in function of the nature (in particular: chemical composition and contaminants) of the gases flowing along the first and second flow paths, the temperatures and temperature variations to which the materials are exposed in use, thermal dilation of the materials, etc.

It will be appreciated that materials with high thermal capacity often may have limited thermal conductivity and vice versa. However, high thermal capacity does not exclude high thermal conductivity. Consequently, whereas the material of the first packing may be different from the material of the second packing, by selecting a high thermal capacity high thermal conductivity material, a same material may be used for the first and for the second packing.

According to one embodiment, the first packing is a loose packing, i.e. a packing which is not attached to the wall or walls of the heat exchanger defining the first flow path. Alternatively all or part of the first packing may be attached to the heat-conducting barrier which separates the first flow path from the second flow path.

When only part of the first packing is attached to the barrier, the remainder of the first packing is in the form of loose packing.

Likewise, the second packing may be a loose packing, i.e. a packing which is not attached to the wall or walls of the heat exchanger defining the second flow path. Alternatively all or part of the second packing may be attached to the heat-conducting barrier which separates the second flow path from the first flow path. When only part of the second packing is attached to the barrier, the remainder of the second packing is in the form of loose packing.

Packing may, for example, be attached to the barrier by cementing the packing to the barrier. However, in the present context, a "packing attached to the barrier" includes a "packing which is integrally formed with the barrier", for example by casting or by 3-D printing.

A very wide range of packing shapes and of positioning (e.g. stacking) packing elements with respect to one another is known in the art.

In practice, the shape and size of the packing, the position of the packing elements in a flow path with respect to one another and with respect to the boundaries of the flow path, etc. are selected on the basis of the required gas/packing heat exchange surface, thermal dilation of the material, the maximum pressure drop, the need to avoid gas-entrainment of the packing, the need to avoid clogging of the packing, etc.

In order to provide efficient transfer of heat from the first to the second flow path, it is advantageous to have a heat-conducting barrier between the two flow paths with a relatively large surface area, in particularly in comparison to the flow cross-section of the second flow path, and preferably also with respect to the flow cross-section of the first flow path. Several configurations are possible. The first flow path may advantageously surround the second flow path. Alternatively, the second flow path may surround the first flow path. Another possibility is to have the first and second flow-paths arranged in a sandwich structure. In that case, the first flow path may be sandwiched between two branches of the second flow path, the first flow path being separated from each of the two branches of the second flow path by means of the gas-impermeable heat-conducting barrier. Alternatively, the second flow path may be sandwiched between two branches of the first flow path, the second flow path being separated from each of the two branches of the first flow path by means of the gas-impermeable heat-conducting barrier. Such a sandwich structure may be repeated within the heat exchanger, in which case the heat exchanger typically contains a succession in alternation of branches of the first flow path and branches of the second flow path, with the gas-impermeable heat conducting membrane separation two successive branches.

The heat exchanger according to the invention is of particular interest for the recovery of heat from exhaust gas from a combustion chamber. In that case, the first gas inlet is connected to the exhaust gas outlet of the combustion chamber, so that exhaust gas from the combustion chamber can enter the heat exchanger via the first gas inlet and flow along the first flow path while heating the first packing before leaving the heat exchanger via the first gas outlet. The first gas outlet may then directly or indirectly be connected to a flue gas chimney or stack.

When the heat exchanger is used for the recovery of heat from exhaust gas from a combustion chamber as described above, the second gas inlet is advantageously connected to a source of gaseous fuel while the second gas outlet is connected to a fuel inlet of the combustion chamber so that gaseous fuel from the fuel source can enter the heat exchanger via the second gas inlet and flow along the second flow path while being in thermal contact with the second packing before leaving the heat exchanger via the second gas outlet and flow from the second gas outlet to the fuel inlet of the combustion chamber in order to be injected into the combustion chamber. The fuel inlet can be the fuel inlet of a fuel lance or a burner of the combustion chamber. When the combustion chamber has multiple fuel inlets, the second gas outlet may be connected to several fuel inlets of the combustion chamber.

The second gas inlet can also advantageously be connected to a source of gaseous combustion oxidant while the second gas outlet is connected to an oxidant inlet of the combustion chamber so that gaseous oxidant from the oxidant source can enter the heat exchanger via the second gas inlet and flow along the second flow path while being in thermal contact with the second packing before leaving the heat exchanger via the second gas outlet and flow from the second gas outlet to the oxidant inlet of the combustion chamber in order to be injected into the combustion chamber. The oxidant inlet can be the oxidant inlet of an oxidant lance or a burner of the combustion chamber.

When the combustion chamber has multiple oxidant inlets, the second gas outlet may be connected to several oxidant inlets of the combustion chamber.

The fuel source can be a source of natural gas, of syngas, of biogas, of petroleum gas, of methane or of another combustible gas. The invention is particularly useful when the gaseous fuel is a low heating value gaseous fuel such as blast furnace gas. In the present context, a "low heating value gaseous fuel" is a gaseous fuel with a calorific value below 15 MJ/m$^3$, typically below 10 MJ/m$^3$.

The oxidant source can be a source of air, such as an air blower or air compressor. Preferably, the oxidant source is a source of a combustion oxidant having an oxygen content of between 80% vol and 100% vol, preferably at least 90% vol, more preferably at least 95% vol. Examples of such an oxidant source are Air Separation Units (ASUs) and liquid oxygen reservoirs or pipelines.

According to an advantageous embodiment, the heat exchanger has two second gas inlets and two second gas outlets and two second gas flow paths each containing a second heat-conductive packing. One of the two second gas flow paths extends from one of the two second gas inlets to one of the second gas outlets and the other of the two second gas flow paths extends from the other of the two second gas inlets to the other of the two second gas outlets. The two second gas flow paths are physically hermetically separated from one another. Both second gas flow paths are also separated from the first flow path by means of a gas-impermeable heat-conducting barrier. The second gas inlet leading into the first of the two second flow paths may then be connected to a source of a gaseous fuel while the second gas outlet at the end of said second flow path is connected to a fuel inlet of the combustion chamber and the second gas inlet leading into the other second flow path may then be connected to a source of a gaseous oxidant while the second gas outlet at the end of said "other second flow path" is connected to an oxidant inlet of the combustion chamber.

In operation, the heat exchanger of the present invention alternates between a first and a second operating stage. During the first operating stage, a hot gas flows from the first gas inlet to the first gas outlet along the first gas flow path, thereby coming into contact with and heating the first heat-regenerative packing, and this while no gas flows along the second gas flow path. During the second operating stage a gas to be heated flows from the second gas inlet along the second gas flow path, thereby coming into contact with and being heated by the second heat-conductive packing, before leaving the heat exchanger as heated gas via the second gas outlet of the heat exchanger, while no gas flows along the first gas flow path.

The heat exchanger of the present invention can be a co-flow heat exchanger or a counter-flow heat exchanger.

The heat exchanger of the present invention is typically operated in pairs.

The present invention thus includes a method of heating a gas to be heated by means of a first and a second heat exchanger according to any one of the embodiments of the invention described above. Said method alternates between a first and a second operating phase.

During the first operating phase:
  a hot gas flows from the first gas inlet to the first gas outlet along the first gas flow path of the first heat exchanger, thereby coming into contact with and heating the first heat-regenerative packing of the first heat exchanger, while no gas flows along the second gas flow path of the first heat exchanger, and
  the gas to be heated flows from the second gas inlet along the second gas flow path of the second heat exchanger, thereby coming into contact with and being heated by the second heat-conductive packing of the second heat exchanger before leaving the second heat exchanger as heated gas via the second outlet of the second heat exchanger, while no gas flows along the first gas flow path of the second heat exchanger.

During the second operating phase:
  the hot gas flows from the first gas inlet to the first gas outlet along the first gas flow path of the second heat exchanger, thereby coming into contact with and heating the first heat-regenerative packing of the second heat exchanger, while no gas flows along the second gas flow path of the second heat exchanger, and
  the gas to be heated flows from the second gas inlet to the second gas outlet along the second gas flow path of the first heat exchanger, thereby coming into contact with and being heated by the second heat-conductive packing of the first heat exchanger before leaving the first heat exchanger as heated gas via the second gas outlet of the first heat exchanger, while no gas flows along the first gas flow path of the first heat exchanger.

As already explained above, the gas to be heated may be a gaseous fuel or a gaseous combustion oxidant, the heated gas being supplied to a combustion chamber via a gas inlet of the combustion chamber.

In such a case, the hot gas is advantageously hot exhaust gas from the combustion chamber, though exhaust gas from a combustion chamber may also be used to heat a gas other than the fuel of oxidant used in the combustion chamber.

The combustion chamber may be the combustion chamber of a furnace and in particular of a furnace selected among melting furnaces, refining furnaces, combined melting/refining furnaces, boilers and incinerators, such as waste incinerators. The melting, refining or melting/refining furnaces can be metal or glass furnaces.

As indicated earlier, the gas to be heated may be a gaseous fuel, preferably a gaseous fuel selected from the group comprising: natural gas, syngas, biogas, petroleum gas, methane, low heating value gaseous fuel or another combustible gas.

As also indicated earlier, the gas to be heated may also be a gaseous combustion oxidant having an oxygen content of from 80% vol to 100% vol, preferably of at least 90% vol and more preferably of at least 95% vol.

BRIEF DESCRIPTION OF THE FIGURES

The present invention and its advantages will be clarified in further detail in the following example, reference being made to FIGS. 1 to 4, whereby.

DETAILED DESCRIPTION OF THE INVENTION

The pair includes a first heat exchanger 100 and a second heat exchanger 200.

Each heat exchanger 100, 200 presents a first gas flow path 110, respectively 210 extending between a first gas inlet 111, respectively 211 and a first gas outlet 112, respectively 212.

Each heat exchanger 100, 200 also presents a second flow path 120, respectively 220 extending between a second gas inlet 121, respectively 221 and a second gas outlet 122, respectively 222.

The first flow path 110, respectively 210 surrounds the second flow path 120, respectively 220, the two flow paths being physically separated from one another by means of a gas-impermeable heat-conducting wall or barrier 130, respectively 230.

The first flow path 110, respectively 210 contains a first heat-regenerative packing 115, respectively 215, which is in physical and heat-conducting contact with the barrier 130, respectively 230.

The second flow path 120, respectively 220 contains a second heat-conductive packing 125, respectively 225. which is in physical and heat-conducting contact with the barrier 130, respectively 230.

Two gas control systems 300, 400 control the supply of gas to the gas inlets 111, 121, 211, 221 and the evacuation of gas from the gas outlets 112, 122, 212, 222 of the first and second heat exchangers 100, 200.

Figure 1:
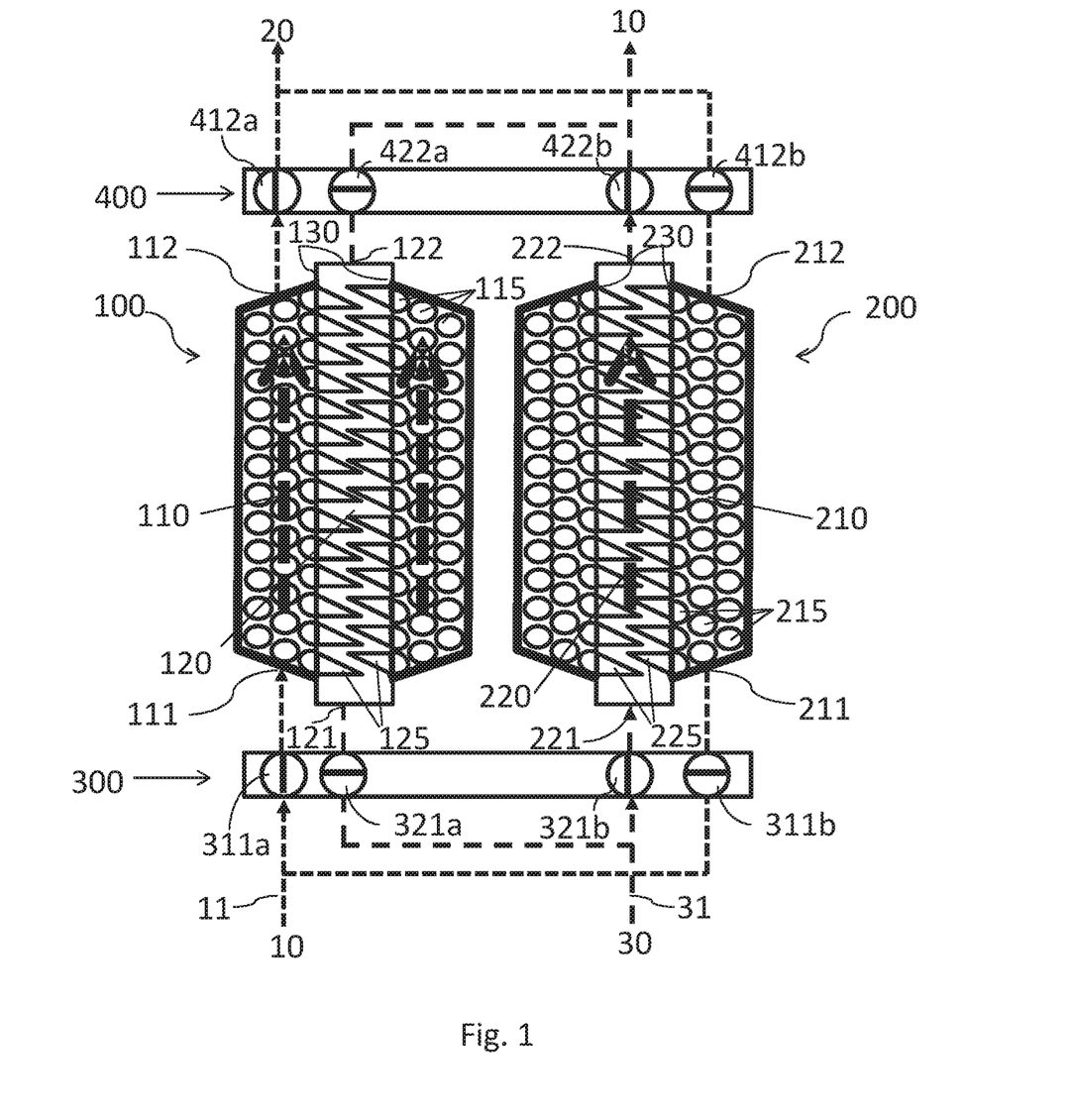
FIGS. 1 and 2 schematically represent the two phases of operation of a pair of co-flow heat exchangers according to the invention and FIGS. 3 and 4 schematically represent the two phases of operation of a pair of counter-flow heat exchangers according to the invention.
Figure 2:
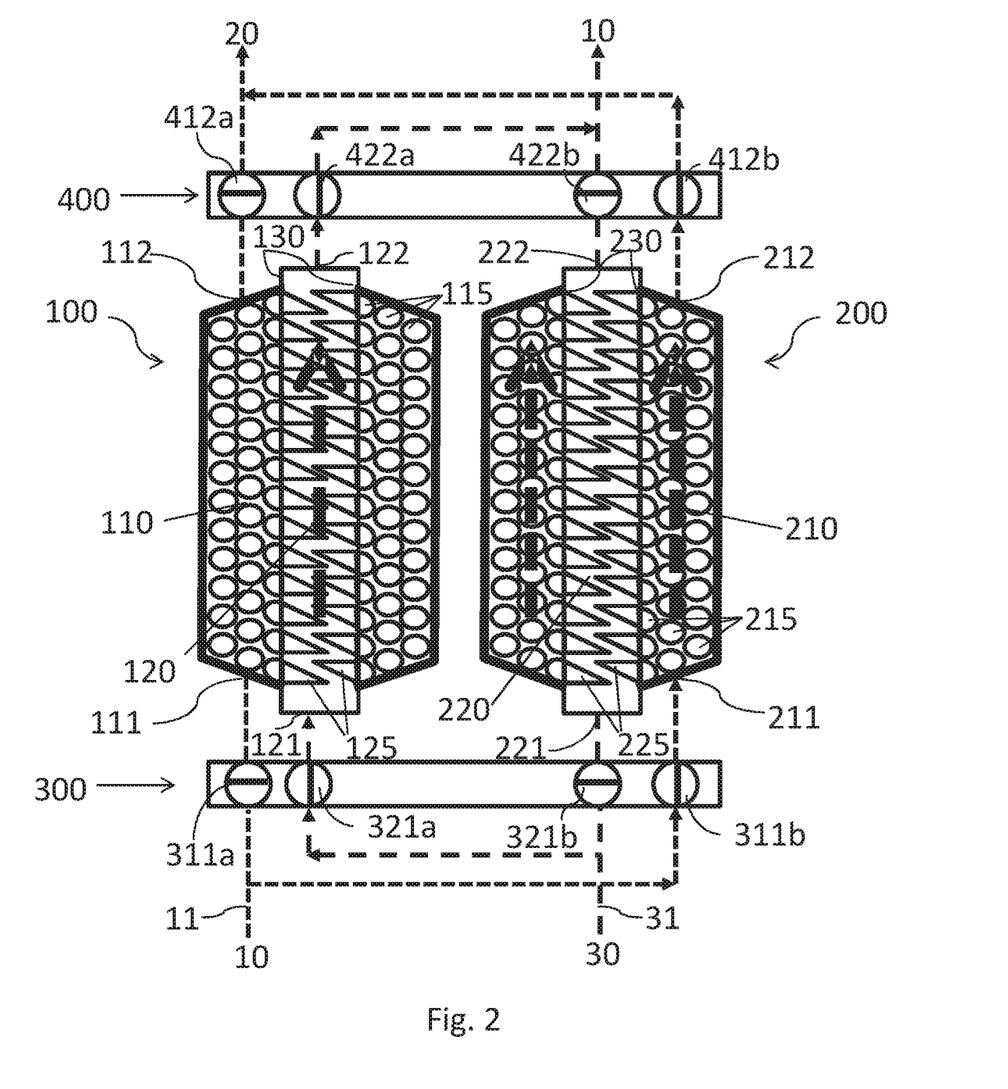

As indicated earlier, FIGS. 1 and 2 illustrate the functioning of a pair of co-flow heat exchangers of the present invention.

During the first operating phase, shown in FIG. 1, gas valves 311a and 412a are open so as to allow a flow of hot gas 11, for example hot exhaust gas from a combustion chamber 10, to flow into the first heat exchanger 100 via its first gas inlet 111 and from first gas inlet 111 along the first gas flow path 110 to the first gas outlet 112 of the first heat exchanger 100 (from bottom to top in FIG. 1). Along the first flow path 110, the hot exhaust gas 11 is in physical and thermal contact with the first packing 115 which is made out of a heat regenerative material, such as alumina. Part of the heat present in the hot exhaust gas 11 is absorbed, retained and accumulated by the first packing 115. The first packing 115 is thus heated by the exhaust gas 11 as it flows along the first gas flow path 110. Downstream of valve 412a, the cooled exhaust gas is sent to a flue gas stack 20. Due to the physical and thermal contact between the first packing 115 and barrier 130 and between barrier 130 and second packing 125, the temperature of barrier 130 and second packing 125 is also increased. As, during the first operating phase, valves 321a and 422a are closed, no gas flows along the second gas flow path 120 at this stage so that no cooling of the second packing 125 takes place.

Simultaneously, during said first operating phase, gas valves 311b and 412b are closed, so that no gas flows along the first gas flow path 210 of the second heat exchanger 200. Valves 321b and 422b are however open so that a gas 31 to be heated, for example a combustion oxidant supplied by a source of combustion oxidant 30, e.g. a reservoir of liquid oxygen, enters the second heat exchanger 200 via its second gas inlet 221 and flows along the second flow path 220 to the second gas outlet 222 (from bottom to top in FIG. 1). As will be explained herebelow with respect to the first heat exchanger 100 during the second operating phase, as the gas to be heated 31 flows along the second flow path 220, it comes into contact with the second packing 225 and is thereby heated. The heated gas leaves the second heat exchanger 200 via its second gas outlet 222.

In the illustrated embodiment, the heated oxidant is then supplied to a combustion oxidant inlet of the combustion chamber 10 which generates the hot exhaust gas, for example to the oxidant inlet of a burner (not shown) of said combustion chamber 10.

During the second operating phase, shown in FIG. 2, gas valves 311a and 412a are closed so that no gas flows along the first gas flow path 110 of the first heat exchanger 100. During said second phase, the hot exhaust gas 11 from combustion chamber 10 is thus not sent to first gas inlet 111 of the first heat exchanger 100, but is instead sent, via open valve 311b to the first gas inlet 211 of the second heat exchanger 200, flows from there along the first gas flow path 210 (from bottom to top in FIG. 2) and leaves the second heat exchanger 200 via its first gas outlet 212. Meanwhile, hot exhaust gas 11 heats the first packing 215 of the second heat exchanger 200. Downstream of open valve 412b, the now cooled exhaust gas is sent to flue gas stack 20. At the same time, the gas to be heated 31, which during the first phase was sent to the second flow path 220 of the second heat exchanger 200, is now sent to the second gas inlet 121 of the first heat exchanger 100. Thereto, valves 321b and 422b are closed and valves 321a and 422a are opened. The gas to be heated thus flows from second gas inlet 121 along the second gas flow path 120 to second gas outlet 122 of the first heat exchanger 100 (from bottom to top in FIG. 2). Along the second gas flow path 120, the gas to be heated is in contact with the second packing 125 which is in physical and thermal contact with barrier 130 and which consists of a heat-conductive material, which may also be alumina. In the process, heat which was absorbed by the first packing 115 during the first phase is transferred from the first packing 115, across barrier 130 to second packing 125 and from second packing 125 and barrier 130 to the gas to be heated 31 which is in contact with the second packing 125 and the barrier 130. After being thus heated, the gas leaves the first heat exchanger 100 via its second gas outlet 122 before being sent as combustion oxidant to the combustion chamber 10. Meanwhile, the first packing 115 progressively cools down.

During the second phase, the first heat exchanger 100 thus operates in the manner in which the second heat exchanger operates during the first phase and the second heat exchanger 200 operates in the second phase in the manner in which the first heat exchanger 100 operates during the first phase.

At the end of the second phase, the installation reverts back to operation in the first phase.

Figure 3:
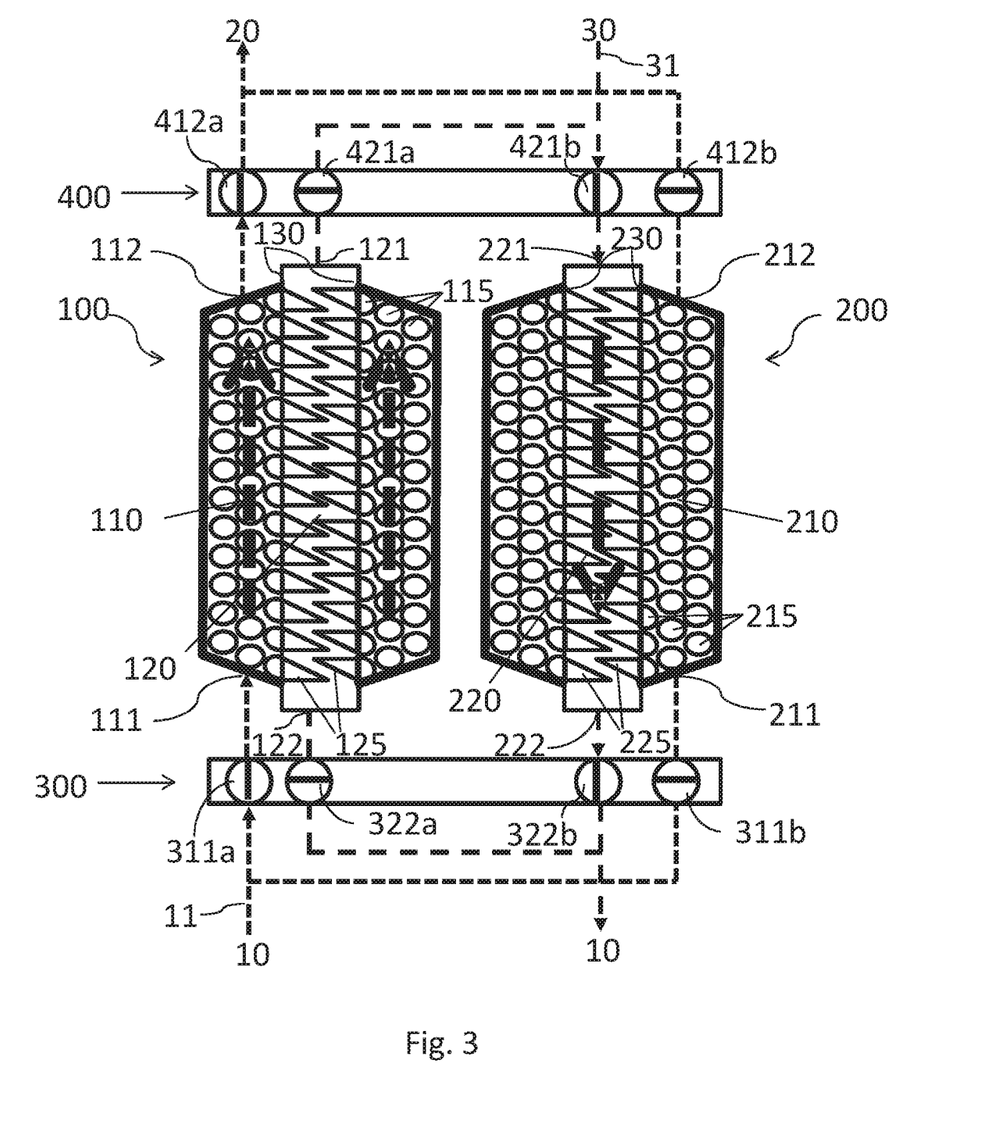
Figure 4:
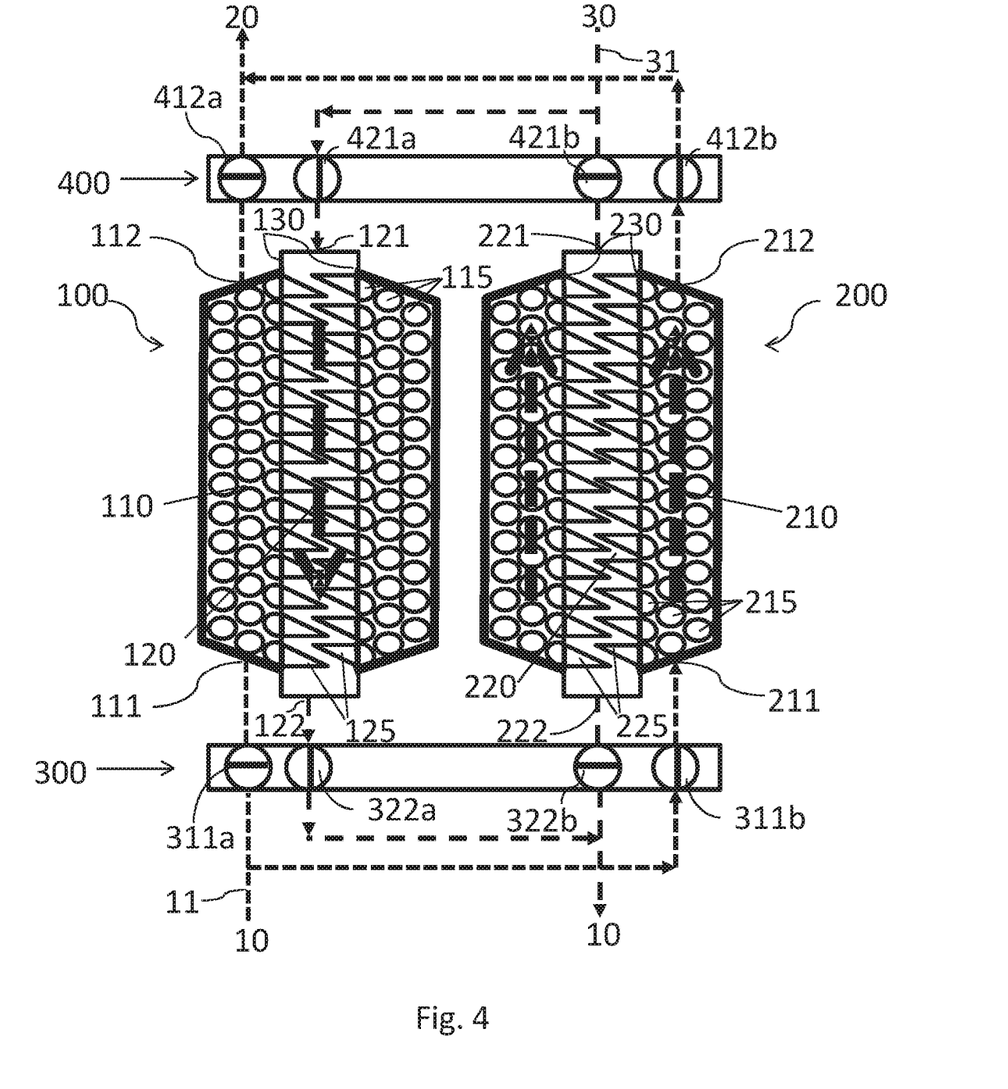

FIGS. 3 and 4 illustrate an alternative embodiment of the invention whereby the first and second heat exchangers 100, 200 are counter-flow heat exchangers.

During the first operating phase, shown in FIG. 3, gas valves 311a and 412a are open so as to allow a flow of hot gas 11, for example hot exhaust gas from a combustion chamber 10, to flow into the first heat exchanger 100 via its first gas inlet 111 and then along the first gas flow path 110 to the first gas outlet 112 of the first heat exchanger 100, as already described with respect to FIG. 1. Valves 421a and 322a are closed so that no gas flows along the second gas flow path 120 of the first heat exchanger 100 at this stage. Gas valves 311b and 412b are closed, so that no gas flows along the first gas flow path 210 of the second heat exchanger 200. Valves 421b and 322b are however open so that a gas 31 to be heated, in case the combustion oxidant supplied by source 30, enters the second heat exchanger 200 via its second gas inlet 221 and flows along the second flow path 220 to the second gas outlet 222 (from the top to the bottom in FIG. 3).

During the second operating phase, shown in FIG. 4, gas valves 311a and 412a are closed, so that no gas flows along the first gas flow path 110 of the first heat exchanger 100, and valves 421a and 322a are open so that the gas to be heated is heated while flowing along the second flow path 120 of the first heat exchanger 100 (from the top to the bottom in FIG. 4). Meanwhile, valves 311b and 412b are open and valves 421b and 322b are closed so that hot exhaust gas 11 flows along the first flow path 210 of the second heat exchanger 200, while no gas flows along the second flow path 220 of said second heat exchanger 200.

The essential difference between the embodiment illustrated in FIGS. 1 and 2 and the embodiment illustrated in FIGS. 3 and 4 is that, according to the first embodiment the hot gas 11 and the gas to be heated 31 cross the first and second heat exchangers 100, 200 in the same flow direction along respectively the first flow path 110, 210 and the second flow path 120, 220, whereas according to the second embodiment the hot gas 11 and the gas to be heated 31 cross the first and second heat exchangers 100, 200 in opposite flow directions along respectively the first flow path 110, 210 and the second flow path 120, 220.

The present invention thus permits to combine the earlier mentioned advantages of regenerative and recuperative heat exchange, namely: the recovery of high levels of thermal energy from hot gases and the heating of a gas to be heated to high temperatures by means of the recovered thermal energy while avoiding all contact between the hot gases and the gas to be heated.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of operating of a heat exchanger that comprises: a first gas inlet, a first gas outlet and a first gas flow path extending from the first gas inlet to the first gas outlet; a second gas inlet, a second gas outlet and a second gas flow path extending from the second gas inlet to the second gas outlet, wherein the first flow path is in thermal contact with but physically separated from the second flow path by means of a gas-impermeable heat-conducting barrier, the first flow path contains a first heat-regenerative packing in physical and heat-conducting contact with the barrier, and the second flow path contains a second heat-conductive packing in physical and heat-conducting contact with the barrier, wherein the first heat-regenerative packing has a specific heat capacity of at least 800 J/(K*kg) and not more than 1250 J/(K*kg) and the thermal conductivity of the second heat-conductive packing at 20° C. is at least 15 W/(m*K) and up to 30 W/(m*K), said method comprising the alternating operation of the heat exchanger, including:
a first operating stage during which a hot gas flows from the first gas inlet to the first gas outlet along the first gas flow path, thereby coming into contact with and heating the first heat-regenerative packing, while no gas flows along the second gas flow path; and
a second operating stage during which a gas to be heated flows from the second gas inlet to the second gas outlet along the second gas flow path, thereby coming into contact with and being heated by the second heat-conductive packing while no gas flows along the first gas flow path, wherein the first flow path surrounds the second flow path or the second flow path surrounds the first flow path, and wherein the first and second heat exchangers are either co-flow or counter-flow heat exchangers.

2. A method of heating a gas using two heat exchangers each of which comprises: a first gas inlet, a first gas outlet and a first gas flow path extending from the first gas inlet to the first gas outlet; a second gas inlet, a second gas outlet and a second gas flow path extending from the second gas inlet to the second gas outlet, wherein the first flow path is in thermal contact with but physically separated from the second flow path by means of a gas-impermeable heat-conducting barrier, the first flow path contains a first heat-regenerative packing in physical and heat-conducting contact with the barrier, and the second flow path contains a second heat-conductive packing in physical and heat-conducting contact with the barrier, wherein the first heat-regenerative packing has a specific heat capacity of at least 800 J/(K*g) and not more than 1250 J/(K*kg) and the thermal conductivity of the second heat-conductive packing at 20° C. is at least 15 W/(m*K) and up to 30 W/(m*K), said method comprising the alternating operation of the heat exchanger between a first operating phase and a second operating phase, whereby:
during the first operating phase:
a hot gas flows from the first gas inlet to the first gas outlet along the first gas flow path of a first of the two heat exchangers, thereby coming into contact with and heating the first heat-regenerative packing of the first heat exchanger, while no gas flows along the second gas flow path of the first heat exchanger, and
gas to be heated flows from the second gas inlet to the second gas outlet along the second gas flow path of the second of the two heat exchangers, thereby coming into contact with and being heated by the second heat-conductive packing of the second heat exchanger while no gas flows along the first gas flow path of the second heat exchanger, and
during the second operating phase:
the hot gas flows from the first gas inlet to the first gas outlet along the first gas flow path of the second of the two heat exchangers, thereby coming into contact with and heating the first heat-regenerative packing of the second heat exchanger, while no gas flows along the second gas flow path of the second heat exchanger, and
the gas to be heated flows from the second gas inlet to the second gas outlet along the second gas flow path of the first heat exchanger, thereby coming into contact with and being heated by the second heat-conductive packing of the first heat exchanger while no gas flows along the first gas flow path of the first heat exchanger, wherein the first flow path surrounds the second flow path or the second flow path surrounds the first flow path, and wherein the first and second heat exchangers are either co-flow or counter-flow heat exchangers.

3. The method of claim 2, wherein the hot gas is an exhaust gas from a combustion chamber.

4. The method of claim 2, wherein the gas to be heated is a fuel or a combustion oxidant and whereby the heated gas leaving the first and second heat exchangers via their second gas outlet is supplied to the combustion chamber.

5. The method of claim 2, whereby the combustion chamber is a combustion chamber of a furnace, the furnace being selected from the group consisting of melting furnaces, refining furnaces, combined melting/refining furnaces, boilers, and incinerators.

* * * * *